Nov. 22, 1949          L. J. BAIR          2,489,003
EDUCATIONAL TOY
Filed Feb. 20, 1946
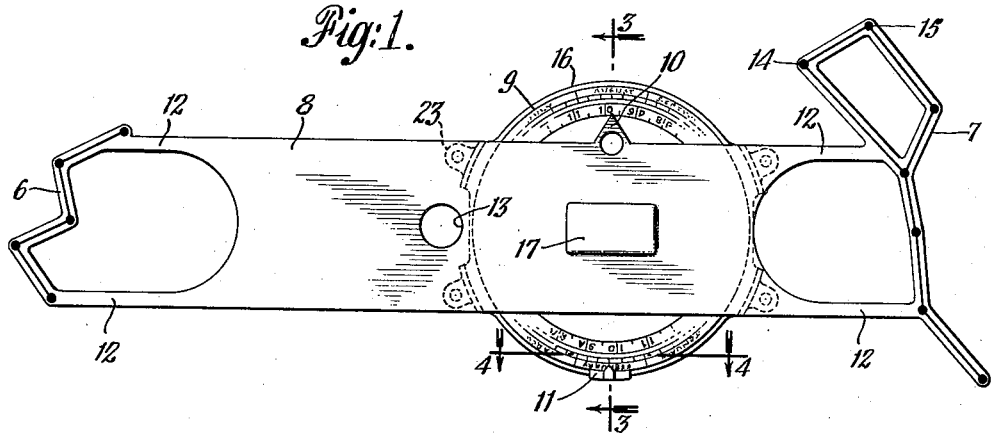
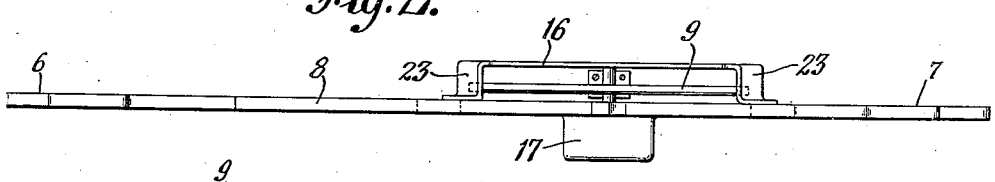
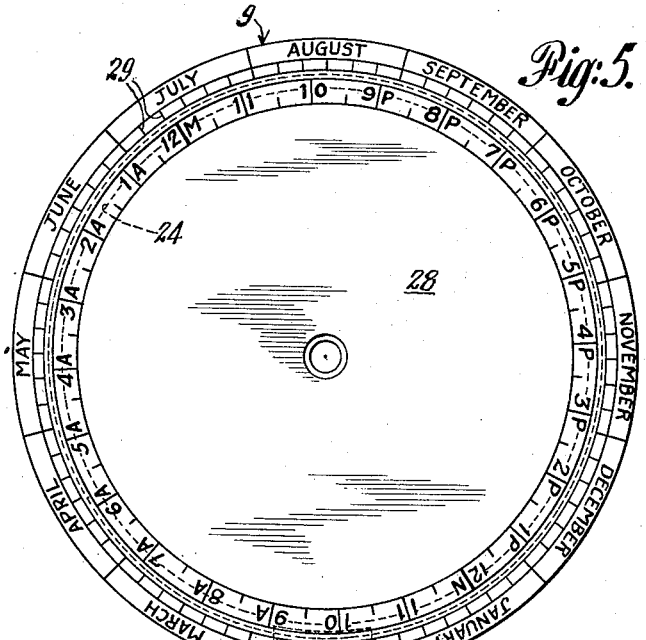
INVENTOR
LEIGH J. BAIR
BY
Donald W. Robertson
ATTORNEY Patented Nov. 22, 1949

2,489,003

UNITED STATES PATENT OFFICE 2,489,003

EDUCATIONAL TOY

Leigh J. Bair, White Plains, N. Y.

Application February 20, 1946, Serial No. 649,030

10 Claims. (Cl. 35—43)

The invention relates to educational toys, and more particularly to a toy instrument for telling time by the stars and for training children and students in certain fundamentals of star observation and identification.

The principal object of my invention is to provide a toy instrument which is so simple to manipulate and understand that, with little instruction, a child can use it to obtain a close approximation of the time by star observation.

An additional object is to provide an educational toy which can be used for direct sighting on star groups of selected constellations to teach the relationship between the positions of such constellations and the time of night for any time of year, and to teach also the effect of the changes in the seasons on the appearance of the night skies.

Other objects and advantages of my invention will appear as the description proceeds.

A particular feature of the invention resides in the self-orienting clock dial which is adjustable in accordance with the date of observation, and which after adjustment requires no further attention during the observations made on any particular evening so that the time reading can be made by the extremely simple operation of merely aligning a star pattern with the heavenly bodies represented in the pattern and reading the time as shown on a 24 hour dial.

In the drawings I have illustrated a preferred embodiment of my invention.

Fig. 1 is a face view of this preferred embodiment, and Fig. 2 a top view thereof.

Fig. 3 is an enlarged vertical cross sectional view taken through the center of the rotary dial as indicated at 3—3 in Fig. 1.

Fig. 4 is a detail cross sectional view taken as indicated at 4—4 in Fig. 1 and showing the adjustable weight for the self-orienting rotary dial.

Fig. 5 is a face view of the rotary dial.

The instrument in its general arrangement comprises one or more star patterns or other sighting means 6, 7, associated with a mounting 8, a rotatable dial 9, indicating means 10 arranged in fixed relationship to the star patterns or sighting means for showing the angular position of the sighting means with respect to the rotatable dial, and a weight 11 associated with the dial and angularly adjustable about the center of rotation of the dial to hold the dial in a predetermined orientation while the sighting means or a star pattern is moved to a position in substantial alignment with the heavenly bodies on which the observation is to be made.

In the preferred construction illustrated, the star patterns 6, 7 are in the form of cut-outs fixed to supporting arms 12 of mounting plate 8. Star pattern 6 represents the five principal stars of the constellation Cassiopeia or Schedir. These five stars appear in the form of the letter M or W, according to the position of the constellation in its diurnal path. Star pattern 7 represents the seven principal stars of Ursae Majoris or Ursa Major, commonly called the "big dipper" from its shape. The star patterns 6 and 7 are made to scale from a suitable star chart, or laid out in accordance with available astronomical data as published by the United States Naval Observatory or data from other standard sources. The relative positions of the two patterns, and the distance between them, as determined from the charts or data referred to, is such as to place them in the same relationship as they will be observed to have in the heavens.

Near the center of mounting plate 8, is an aperture 13, approximately in line with Alpha and Beta Ursae Majoris 14 and 15 respectively. The exact position of the center of this aperture in relation to the star patterns corresponds to that of the pole star, Polaris, in the heavens, and likewise is determinable from available star charts and astronomical data. The drawing of this patent shows approximately the correct relationship of the star patterns for the selected constellations and the aperture for Polaris.

The rotatable dial 9 may be mounted in any convenient position in relation to the star patterns, but should be so located as not to overlie either of the patterns nor obscure a sight through aperture 13. A preferred form of mounting is shown in Fig. 3 wherein the dial is pivoted between the plate 8 and a bracket 16 secured thereto. It is important that the dial be pivoted for free rotation with little friction so that it will seek its correct orientation under the influence of weight 11 regardless of the angle of inclination of the axis of the pivot during the making of time observations. (When the instrument is used by an observer at latitude 40° N., for example, the dial pivot shaft will be inclined at an angle of approximately 40° to the horizontal when held in the normal position naturally assumed by the observer, although this exact angle is not essential and need not be consciously taken into account.) To assist in free pivoting of the dial when held at an angle, I use a somewhat elongated pivot shaft and reduced area of bearing, particularly in forward thrust. To accommodate the long pivot I prefer to arrange the handle 17 in line with the pivot shaft 18. The forward end of pivot shaft 18 is received in the bore 19 extending into the handle from the back of the instrument (Fig. 3). The bore 19 is counterbored or widened out at 20 to reduce the bearing area and bring the center of bearing forward. If the frame and handle be formed of a molded plastic resin or other material which is relatively soft, it may be desirable to put a small metal bearing plate 21 at the end of bore 19 for engagement by the rounded or conical point at the forward end of the pivot shaft 18. This permits free turning of the dial when its pivot shaft is inclined to the horizontal as the observer looks up to the sky. The rearward end of pivot shaft 18 is of reduced diameter as at 22 and engages a small hole in the bracket 16 in line with the bore 19.

The dial 9 may be formed integrally with the pivot shaft 18, or it may be made separately, with a central aperture, and held to the pivot by a force fit or otherwise be suitably mounted on the shaft for rotation relatively to the star patterns.

In my preferred construction the bracket 16 is of generally circular form and is made somewhat larger than the dial 9 to act as a guard plate for protection of the dial. It is mounted on the supporting frame 8 by means of flanged extensions 23 which may be secured to the frame by screws, waterproof glue or otherwise.

The dial 9 has an annular groove 24 for engagement by the weight 11. The weight is of generally L-shape and has a pointer 25 overlying the face of the dial. To the back of the weight is detachably secured an arcuate retaining plate 26 which fits the annular groove 24 of the dial to hold the weight in assembled relationship with the dial while permitting angular adjustment of the weight about the center of rotation of the dial, i. e. adjustment around the periphery of the dial. Retaining plate 26 is fastened to the weight, as by the screws shown, after the weight has been placed over the edge of the dial. A spring 27 secured to the weight and frictionally engaging the back of the dial, or other resilient or friction means, serves to hold the weight in its adjusted positions.

The dial is provided with two series of graduations molded, etched, engraved, printed, or otherwise produced thereon. If desired, these graduations may be produced on a separate card 28 secured to dial plate 9. The graduations and other dial markings may be treated with luminous paint for convenience in reading at night. The outer series of graduations forms a date scale by months and lesser divisions. As shown, the divisions 29 represent five day intervals, but the graduations may be carried down to single day intervals if desired. The inner series of graduations forms a 24-hour scale. As shown, this scale is graduated in half hour intervals, but the divisions may be carried down to smaller time intervals if desired.

The interrelation between the date and hour scales is determined by the relative positions of the pointer, or hour hand, 10, and the star pattern or patterns. For example, if the pointer 10 were on the lower side of the frame 8, the hour scale would need to be rotated 180° from the position shown, with the date scale unchanged in position. The drawing shows the correct relationship of the star patterns, hour hand, date and hour scales with as great accuracy as can be done in a patent drawing. Calibration of the dial may, if desired, be performed by actual observation with the star patterns although this is not necessary.

To tell the time from the stars with the use of my invention the weight 11 is first set to correspond with the day of the year. This setting is made by pressing a finger against the edge of the dial at a point removed from the weight, and then with the thumb and forefinger of the other hand sliding the weight around the edge of the dial in either direction to bring pointer 25 opposite the correct date reading. Thus, assuming the date of February 15 for example, the weight is moved to the position shown in the drawing. This setting can be made at any time when light is available, as in the house or car, or with the aid of a flashlight. Consequently, the date graduations need not be luminous nor illuminated, and if luminous paint is used on the dial, I prefer to confine its use to the hour scale and hour hand.

Once the date setting has been made, the dial is self-orienting, and no further adjustment of the instrument is required during the evening. Thus a series of observations can be made having regard only to the hour reading shown by the pointer 10. To obtain a reading, the observer looks at the northern sky for one of the constellations represented in the star patterns. It may be that both Cassiopeia and Ursa Major will be visible, or, depending upon the time of year and time of night, or the extent to which the northern sky is clouded, perhaps only one of these constellations can be seen. We shall assume that on February 15, 1947, Ursa Major is clearly visible. The observer grasps the handle 17 of the instrument and holds it between his his eyes and the sky in position to bring the big dipper pattern into substantial alignment with the seven principal stars of Ursa Major. If the stars themselves make a pattern which is smaller in apparent size than the pattern of the instrument this shows that the instrument is being held too close to the eyes, and vice versa. Therefore the observer moves the instrument to and fro and twists it this way or that until, by a simple process of trial and error, he finds that his star pattern lines up with the stars represented in the pattern. At this moment Polaris should also be seen through aperture 13. If it is not seen, some further adjustment of the instrument's position may be required. The hour is then read direct by noting the position of the hour hand on the dial. If the star pattern is opaque, as it can be, it will mask out the seven principal stars of Ursa Major when properly held. If the pattern is transparent or translucent, this is not the case, and the observer will then see the stars through his pattern. A transparent pattern has the advantage that it can be traced on a solid disc attached to the frame 8, avoiding the projecting parts of a cut-out pattern. The tracing on the disc can be opaque, or the disc may have apertures for each of the stars which form the pattern, like the aperture 13 shown for Polaris.

In the event the two constellations represented in the patterns are both visible (as they could be at 9:45 p.m. on February 15 when both are well above the horizon) the instrument may be used for sights on either one, or both together. If the observer is familiar with the big dipper, but not Cassiopeia's Chair, this will enable him to locate the latter for himself so he can learn to recognize it. Assuming that the observer knows the hour, but does not know how to recognize any one of the constellations which may be represented in his star pattern instrument, he needs only to set the hour hand at the correct time and the instrument will show him where to find each constellation.

In case a non-luminous dial is employed, the instrument is sighted as has been described and the dial then held by pressing a fore-finger against its edge to prevent rotation while it is brought to a light for reading the time.

The time shown will be a close approximation of the correct time in any locality. If the observer is located just over the edge of a time zone belt he may find that the reading will be as much as 30 minutes away from the time shown by his watch, although for the most part he will be within 10 or 15 minutes of standard time. In this connection he learns that time as measured directly by apparent movement of the stars progressively changes with changes in longitude, little by little, as distinguished from standard time which jumps by hourly intervals. My invention is primarily intended as an instructive toy, and extreme accuracy is not essential. However, it will be found to give suprisingly close approximations of the time in addition to its value as an instrument for instruction and for awakening an interest in elementary astronomy and star identification.

The preferred construction which I have described is designed for use in latitudes north of the equator, particularly the north temperate zone. However, it will be understood that a similar instrument can be made for latitudes south of the equator by selecting constellations among the south circumpolar stars. As there is no star for the south pole corresponding to Polaris, the aperture 13 could be omitted for the south latitudes instrument.

The instrument can be designed with a single sighting means or star group, or it can embody two or more star groups may be desired. The entire instrument can be made of transparent plastic resins, wood, metal, or combinations of these. A table of corrections may be provided for use with the instrument to convert the direct readings to more exact standard time readings for each of a number of selected geographical locations. Such a table can be constructed by test readings or from available astronomical data. If desired, the date scale may be adjustable by slight circumferential movement in relation to the hour scale, so that no table of corrections would be required. In this case, errors observed in readings taken adjacent a time zone marginal belt will be eliminated. The adjustment of the scales can be made in accordance with test readings or from a correction table furnished with the instrument and compiled from test data or available astronomical data published by the United States Government.

The terms and expressions which I have employed are used in a descriptive and not a limiting sense, and I have no intention of excluding such equivalents of the invention described, or of portions thereof, as fall within the purview of the claims.

I claim:

1. An educational toy comprising a star pattern, a dial rotatably mounted in relation to the star pattern, indicating means arranged in fixed relationship to the star pattern for showing the angular disposition of the star pattern with respect to the rotatable dial, and a weight associated with the dial and angularly adjustable about the center of rotation of the dial to hold the dial in a predetermined orientation while the star pattern is moved to a position in substantial alignment with the heavenly bodies represented in the pattern.

2. An educational toy comprising a rotatable dial and a mounting therefor, sighting means associated with the mounting for alignment with a plurality of selected heavenly bodies, indicating means arranged in fixed relationship to the sighting means for showing the angular disposition of the sighting means with respect to the rotatable dial, and a weight associated with the dial and angularly adjustable about the center of rotation of the dial to hold the dial in a predetermined orientation while the sighting means is moved to a position in substantial alignment with the selected heavenly bodies.

3. An educational instrument comprising a star pattern, a clock dial rotatably mounted in relation to the star pattern, indicating means arranged in fixed relationship to the star pattern for showing the time in accordance with the angular disposition of the star pattern with respect to the clock dial, and a weight associated with the dial and angularly adjustable about the center of rotation of the dial to hold the dial in a predetermined orientation while the star pattern is moved to a position in substantial alignment with the heavenly bodies represented in the pattern to produce that angular disposition of the star pattern with respect to the clock dial which will show the time as observed by the instrument.

4. An educational instrument comprising a rotatable clock dial and a mounting therefor, sighting means associated with the mounting for alignment with a plurality of selected heavenly bodies, indicating means arranged in fixed relationship to the sighting means for showing the time in accordance with the angular disposition of the sighting means with respect to the clock dial, and a weight associated with the dial and angularly adjustable about the center of rotation of the dial to hold the dial in a predetermined orientation while the sighting means is moved to a position in substantial alignment with the selected heavenly bodies to produce that angular disposition of the sighting means with respect to the clock dial which will show the time as observed by the instrument.

5. An educational toy comprising a star pattern, a dial rotatably mounted in relation to the star pattern, indicating means arranged in fixed relationship to the star pattern for showing the angular disposition of the star pattern with respect to the rotatable dial, and a weight associated with the dial and angularly adjustable about the center of rotation of the dial to hold the dial in a predetermined orientation while the star pattern is moved to a position in substantial alignment with the heavenly bodies represented in the pattern, the dial having hour graduations and date graduations arranged in predetermined fixed relationship whereby adjustment of said weight to the date of observation orients the hour graduations in relation to the heavens so that said indicating means will show the time.

6. An educational toy comprising a plurality of star patterns, a dial rotatably mounted in relation to the star patterns, indicating means arranged in fixed relationship to the star patterns for showing the angular disposition of the star patterns with respect to the rotatable dial, and a weight associated with the dial and angularly adjustable about the center of rotation of the dial to hold the dial in a predetermined orientation while at least one of the star patterns is moved into a position in substantial observed alignment with the heavenly bodies represented in the pattern.

7. An educational toy comprising a plurality of star patterns and a mounting therefor, a sighting aperture in the mounting, a dial rotatably secured to the mounting, indicating means associated with the mounting for showing the angular disposition of the star patterns with respect to the rotatable dial, and a weight associated with the dial and angularly adjustable about the center of rotation of the dial to hold the dial in a predetermined orientation while at least one of the star patterns is moved into a position in substantial observed alignment with the heavenly bodies represented in the pattern and Polaris is observed through the sighting aperture.

8. An educational toy comprising patterns of star groups of the constellations Ursa Major and Cassiopeia, a mounting for the patterns, a sighting aperture in the mounting, the mounting and its sighting apertures being arranged to support the patterns in correct relative positions for celestial observation, a dial rotatably secured to the mounting, indicating means associated with the mounting for showing the angular disposition of the star patterns with respect to the rotatable dial, and a weight associated with the dial and angularly adjustable about the center of rotation of the dial to hold the dial in a predetermined orientation while at least one of the star patterns is moved into a position in substantial observed alignment with the heavenly bodies represented in the pattern and Polaris is observed through the sighting aperture.

9. An educational toy comprising a star pattern, a dial rotatably mounted in relation to the star pattern, indicating means arranged in fixed relationship to the star pattern for showing the angular disposition of the star pattern with respect to the rotatable dial, the dial having hour graduations and date graduations arranged in predetermined fixed relationship whereby adjustment of the dial in accordance with the date of observation orients the hour graduations in relation to the heavens so that said indicating means will show the time.

10. In an educational toy for telling time by the stars, a dial having coordinated date and hour scales, means for adjusting the dial for self-righting in accordance with selected dates, and means for aligning an indicating member by sighting on multiple stars whereby said indicating member will show the time on said hour scale.

LEIGH J. BAIR.

REFERENCES CITED

The following references are of record in the file of this patent:

UNITED STATES PATENTS

| Number | Name | Date |
| --- | --- | --- |
| 584,954 | McArthur | June 22, 1897 |
| 743,483 | Gentry | Nov. 10, 1903 |
| 1,126,231 | Kullmer | Jan. 26, 1915 |
| 1,480,793 | Sundell | Jan. 15, 1924 |
| 1,676,912 | Meacham | July 10, 1928 |
| 2,032,829 | Bartky | Mar. 3, 1936 |
| 2,340,023 | Sites | Jan. 25, 1944 |